(12) United States Patent
Lu (10) Patent No.: US 10,992,459 B2
(45) Date of Patent: Apr. 27, 2021

(54) UPDATING A STATE MERKLE TREE

(71) Applicant: Advanced New Technologies Co., Ltd., George Town (KY)

(72) Inventor: Zhonghao Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,455

(22) Filed: Jan. 31, 2020

(65) Prior Publication Data

US 2021/0067321 A1  Mar. 4, 2021

Related U.S. Application Data

(63) Continuation of application No. PCT/CN2020/071573, filed on Jan. 11, 2020.

(30) Foreign Application Priority Data

Aug. 30, 2019  (CN) .......................... 201910816557.5

(51) Int. Cl.
 *H04L 9/06* (2006.01)
 *G06F 16/901* (2019.01)
(52) U.S. Cl.
 CPC ........ *H04L 9/0643* (2013.01); *G06F 16/9027* (2019.01); *H04L 9/0637* (2013.01); *H04L 2209/38* (2013.01)
(58) Field of Classification Search
 CPC . H04L 9/0643; H04L 9/0637; H04L 2209/38; G06F 16/9027

(Continued)

(56) References Cited

U.S. PATENT DOCUMENTS 10,152,481 B1   12/2018  Singh
10,700,852 B2 *  6/2020  Xie ..................... H04L 9/0637
(Continued)

FOREIGN PATENT DOCUMENTS

CN       101868791       10/2010
CN       103218574        7/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jahangir Kabir
(74) *Attorney, Agent, or Firm* — Fish & Richardson P.C.

(57) ABSTRACT

Implementations of the present specification provide a method for updating a state Merkle tree, where the state Merkle tree is used to store a state of an account in a blockchain network. The method includes: accessing data related to a state Merkle tree that stores a state of an account in a blockchain network; determining to-be-updated nodes that need to be updated in the state Merkle tree due to a state change of the account; extracting one first subtree and M second subtrees from the state Merkle tree based on the to-be-updated nodes; allocating the M second subtrees to N worker threads, wherein two or more of the N worker threads process in parallel the M second subtrees to obtain each updated second subtree; and updating at least the first subtree based on hash values of root nodes of the updated second subtrees, to obtain an updated state Merkle tree.

18 Claims, 6 Drawing Sheets

(58) Field of Classification Search
USPC .................................................. 713/150, 168
See application file for complete search history.

(56) References Cited

U.S. PATENT DOCUMENTS

| | | | |
|---|---|---|---|
| 2009/0037491 A1* | 2/2009 | Cachin | G06F 21/64 |
| 2017/0300877 A1 | 10/2017 | Mann et al. | |
| 2018/0294977 A1* | 10/2018 | Uhr | G06Q 20/38215 |
| 2018/0343128 A1* | 11/2018 | Uhr | H04L 9/3268 |
| 2019/0103973 A1 | 4/2019 | Chalkias et al. | |
| 2019/0228386 A1* | 7/2019 | Onnainty | G06Q 20/065 |
| 2019/0334726 A1* | 10/2019 | Kelly | H04L 9/3247 |
| 2019/0379754 A1* | 12/2019 | Krishnaswamy | H04L 67/1095 |
| 2020/0067697 A1* | 2/2020 | Puddu | G06F 21/602 |

FOREIGN PATENT DOCUMENTS

| | | |
|---|---|---|
| CN | 106407795 | 2/2017 |
| CN | 108595980 | 9/2018 |
| CN | 109165224 | 1/2019 |
| CN | 109285005 | 1/2019 |
| CN | 109919756 | 6/2019 |
| CN | 110011785 | 7/2019 |
| CN | 110096505 | 8/2019 |
| CN | 110175188 | 8/2019 |
| WO | WO 2019063995 | 4/2019 |

OTHER PUBLICATIONS

Nakamoto, "Bitcoin: A Peer-to-Peer Electronic Cash System," www.bitcoin.org, 2005, 9 pages.

cnblogs.com [online], "Merkle Tree Learning", May 27, 2016, retrieved on Jun. 5, 2020, retreived from URL<https://www.cnblogs.com/fengzhiwu/p/5524324.html>, 24 pages.

crypto.stackexchange.com [online], "Merkle hash tree updates", 2015, retrieved on Jun. 5, 2020, retrieved from URL<https://crypto.stackexchange.com/questions/22669/merkle-hash-tree-updates>, 6 pages.

Di, "On Integrity Verification Schemes in Cloud Data", A Dissertation for Master's Degree of Guangdong University of Technology, May 2018, 66 pages (with English Abstract).

PCT International Search Report and Written Opinion in International Application No. PCT/CN2020/071573, dated Apr. 24, 2020, 19 pages (with machine translation).

Yang et al., "Blockchain-Based Publicly Verifiable Data Deletion Scheme for Cloud Storage", Journal of Network and Computer Applications, Nov. 28, 2017, 30 pages.

Yuqin, "Research on Blockchain Consensus Mechanism Performance Based on Master and Slave Multi-chain Model", Thesis for Master Degree at Shandong University, Apr. 20, 2018, 66 pages (with English Abstract).

* cited by examiner

UPDATING A STATE MERKLE TREE

CROSS-REFERENCE TO RELATED APPLICATIONS

This application is a continuation of PCT Application No. PCT/CN2020/071573, filed on Jan. 11, 2020, which claims priority to Chinese Patent Application No. 201910816557.5, filed on Aug. 30, 2019, and each application is hereby incorporated by reference in its entirety.

TECHNICAL FIELD

One or more implementations of the present specification relate to the field of blockchain technologies, and in particular, to a method and an apparatus for updating a state Merkle tree used to record an account state in blockchain.

BACKGROUND

In a new generation of blockchain, for example, Ethereum, concept of account is added. Accordingly, a user can create an account by using a blockchain platform. In such a scenario, the blockchain platform functions as a node in a blockchain network, and the account created by the user is an external account of Ethereum. In addition, many blockchain platforms such as Ethereum support smart contracts to execute more transactions. A smart contract can be created by a user and has a corresponding contract account after it is created. As such, accounts in the blockchain network can include external accounts and contract accounts.

In each node of the blockchain network, state data of all accounts (including external accounts and contract accounts) in the blockchain is maintained in form of a state Merkle tree in a local database of the node. As transactions in the blockchain are executed, an account state changes, which requires updating the state Merkle tree. Due to a large number of accounts and frequent transactions in the blockchain network, the state Merkle tree often needs to be updated.

SUMMARY

One or more implementations of the present specification describe a method and an apparatus for updating a state Merkle tree. Update efficiency of the state Merkle tree is improved by using a parallel processing method, and overall performance of a blockchain network is improved.

According to a first aspect, a method for updating a state Merkle tree is provided, where the state Merkle tree is used to store a state of an account in a blockchain network, and the method is performed by any node in the blockchain network and includes: determining to-be-updated nodes that need to be updated in the state Merkle tree due to a state change of the account; extracting one first subtree and M second subtrees from the state Merkle tree based on the to-be-updated nodes, where the first subtree includes a root node of the state Merkle tree, where there is no intersection between any two of the M second subtrees, where a root node of each second subtree is a to-be-updated node and is a child node of a bottom-layer node in the first subtree, and where M is an integer greater than 1; allocating the M second subtrees to N worker threads, so at least some of the N worker threads process in parallel the M second subtrees to obtain each updated second subtree, where N is an integer greater than 1; and updating the first subtree at least based on hash values of root nodes of the updated second subtrees, to obtain an updated state Merkle tree.

According to an implementation, before determining to-be-updated nodes that need to be updated in the state Merkle tree due to a state change of the account, the method further includes: executing each transaction in a transaction set to determine a state change of an account involved in the transaction.

Further, in an implementation, the transaction set can be a set consisting of multiple transactions selected from a local transaction pool; in such case, the method further includes: packaging the transaction set into a to-be-generated first block after the updated state Merkle tree is obtained, and recording a hash value of a root node of the updated state Merkle tree into the first block.

In another implementation, the transaction set can be a set consisting of transactions included in a to-be-verified block; in such case, the method further includes: comparing a hash value of a root node of the updated state Merkle tree with a value of a state root recorded in the to-be-verified block after the updated state Merkle tree is obtained, to verify the to-be-verified block.

According to an implementation, the to-be-updated nodes in the state Merkle tree are determined by: in the state Merkle tree, tracing back to the root node starting from all leaf nodes that correspond to accounts whose state changes, and determining each node on a trace path as the to-be-updated nodes.

In an implementation, the first subtree is extracted by extracting nodes starting from the root node to a predetermined layer in the state Merkle tree as the first subtree.

In another implementation, the first subtree is extracted by traversing the state Merkle tree layer by layer starting from the root node based on a breadth-first search, and if the number of to-be-updated nodes at a current layer is greater than or equal to a first predetermined threshold, extracting nodes starting from the root node to the current layer as the first subtree.

According to an implementation, the second subtree is extracted by: obtaining to-be-updated nodes in bottom-layer nodes of the first subtree as a first node set; obtaining to-be-updated nodes in child nodes of each node in the first node set as a second node set; and separately using each node in the second node set as a starting node to obtain subtrees starting from each starting node to a leaf node as the M second subtrees.

According to another implementation, the first subtree and the second subtree are extracted by: traversing the state Merkle tree layer by layer starting from the root node based on a breadth-first search, if the number of to-be-updated nodes at a current layer is greater than or equal to a second predetermined threshold, extracting nodes starting from the root node to the upper layer of the current layer as the first subtree, and using each to-be-updated node at the current layer as a starting node to obtain subtrees starting from each starting node to a leaf node as the M second subtrees.

In an implementation, the M second subtrees are allocated to the N worker threads by: separately numbering the M second subtrees and the N worker threads, so each second subtree has a corresponding first number, and each worker thread has a corresponding second number; and for any second subtree of the M second subtrees, determining a modulo result of a first number modulo N, and allocating the second subtree to a worker thread whose second number is the modulo result, where the first number corresponds to the second subtree.

According to a second aspect, an apparatus for updating a state Merkle tree is provided, where the state Merkle tree is used to store a state of an account in a blockchain network, and the apparatus is deployed on any node in the blockchain network and includes: a node determining unit, configured to determine to-be-updated nodes that need to be updated in the state Merkle tree due to a state change of the account; a subtree extraction unit, configured to extract one first subtree and M second subtrees from the state Merkle tree based on the to-be-updated nodes, where the first subtree includes a root node of the state Merkle tree, where there is no intersection between any two of the M second subtrees, where a root node of each second subtree is a to-be-updated node and is a child node of a bottom-layer node in the first subtree, and where M is an integer greater than 1; a parallel processing unit, configured to allocate the M second subtrees to N worker threads, so at least some of the N worker threads process in parallel the M second subtrees to obtain each updated second subtree, where N is an integer greater than 1; and a comprehensive update unit, configured to update the first subtree at least based on hash values of root nodes of the updated second subtrees, to obtain an updated state Merkle tree.

According to a third aspect, a computer readable storage medium that stores a computer program is provided, and when the computer program is executed on a computer, the computer is caused to perform the method of the first aspect.

According to a fourth aspect, a computing device is provided and includes a memory and a processor. Executable code is stored in the memory, and when executing the executable code, the processor implements the method of the first aspect.

According to the method and the apparatus provided in some implementations of the present specification, when a state Merkle tree needs to be updated, the part that needs to be updated in the state Merkle tree is divided into a root subtree on an upper layer and multiple mutually independent dirty subtrees below the root subtree. Then, the multiple dirty subtrees are updated in parallel by using multiple worker threads. Finally, the root subtree is updated based on the results of updating the dirty subtrees by the worker threads, to update the entire state Merkle tree. Compared with a conventional method that update processing is performed upward layer by layer in series starting from a leaf node, the method for processing multiple dirty subtrees in parallel and then performing summarization can significantly improve update efficiency of the state Merkle tree, thereby improving system performance of an entire blockchain network.

BRIEF DESCRIPTION OF DRAWINGS

To describe the technical solutions in the implementations of the present disclosure more clearly, the following briefly describes the accompanying drawings needed for describing the implementations. Apparently, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Figure 1:
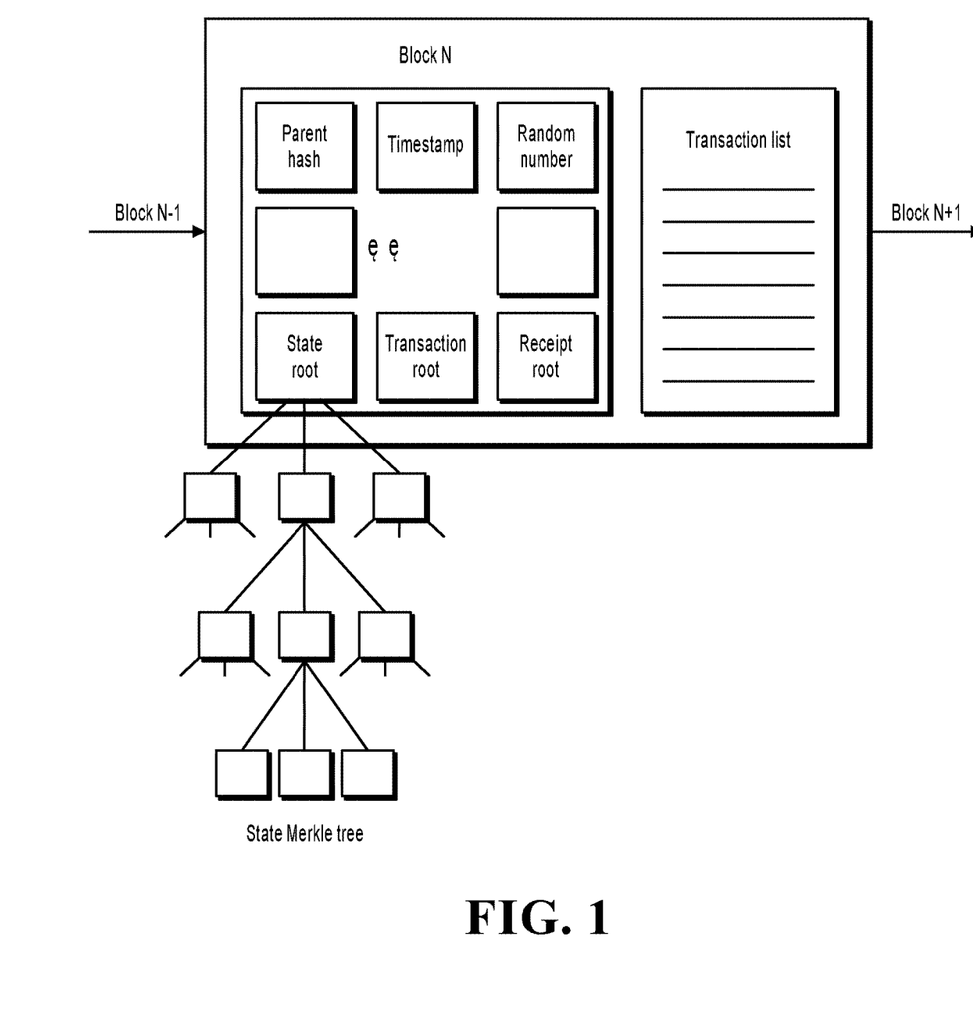
FIG. 1 is a schematic structural diagram illustrating a block in an implementation.

A person skilled in the art knows that in a blockchain network, transaction data is recorded in a form of block, and a newly generated block is added to the blockchain after gaining consensus of all nodes in the network, so data cannot be tampered with. FIG. 1 is a schematic structural diagram illustrating a block in an implementation. It should be understood that the block structure in FIG. 1 is described by using Ethereum as an example. Other blockchain platforms can generate a slightly different block structure.

As shown in FIG. 1, each block in the blockchain includes at least a block header and a transaction list. The block header records multiple types of information used to link the current block to the blockchain, including a hash value of a parent block, a timestamp, a random number to be calculated, etc. The transaction list includes a series of transactions selected by a node that generates the current block from a transaction pool and recorded in the current block. To facilitate identifying and verifying the account state and transaction state, the block in Ethereum further includes root information of three Merkle trees. The three Merkle trees are respectively a state tree, a transaction tree, and a receipt tree, and corresponding root information is respectively a state root, a transaction root, and a receipt root. The state Merkle tree is used to record state information of all accounts in the blockchain network, the transaction tree is used to record transaction content information in the current block, and the receipt tree is used to record transaction receipt information in the current block. The transaction tree and the receipt tree are one-time Merkle trees generated for a transaction in the current block, and generally do not need to be updated. However, the state Merkle tree needs to be frequently updated based on account state changes. Therefore, the state Merkle tree is mainly concerned in the implementations of the present specification.

The state Merkle tree stores a correspondence between a state key and a state value in a tree structure. Nodes in the tree are connected through hashing, that is, a hash value is generated based on a child node and stored in a parent node. In a case of recording an account state, Key is an account address, and Value is an account state or account content. In a specific implementation, the state Merkle tree can be, for example, a Merkle Patricia Tree (MPT). A leaf node of the MPT tree is an account state of each account, and each parent node above a leaf node includes at least one address character of an account address and hash values that correspond to all child nodes of the parent node. A hash value of a root node can be recursively obtained based on each layer of nodes, and the root hash is a state root of the state tree and is recorded in the block shown in FIG. 1.

Figure 2:
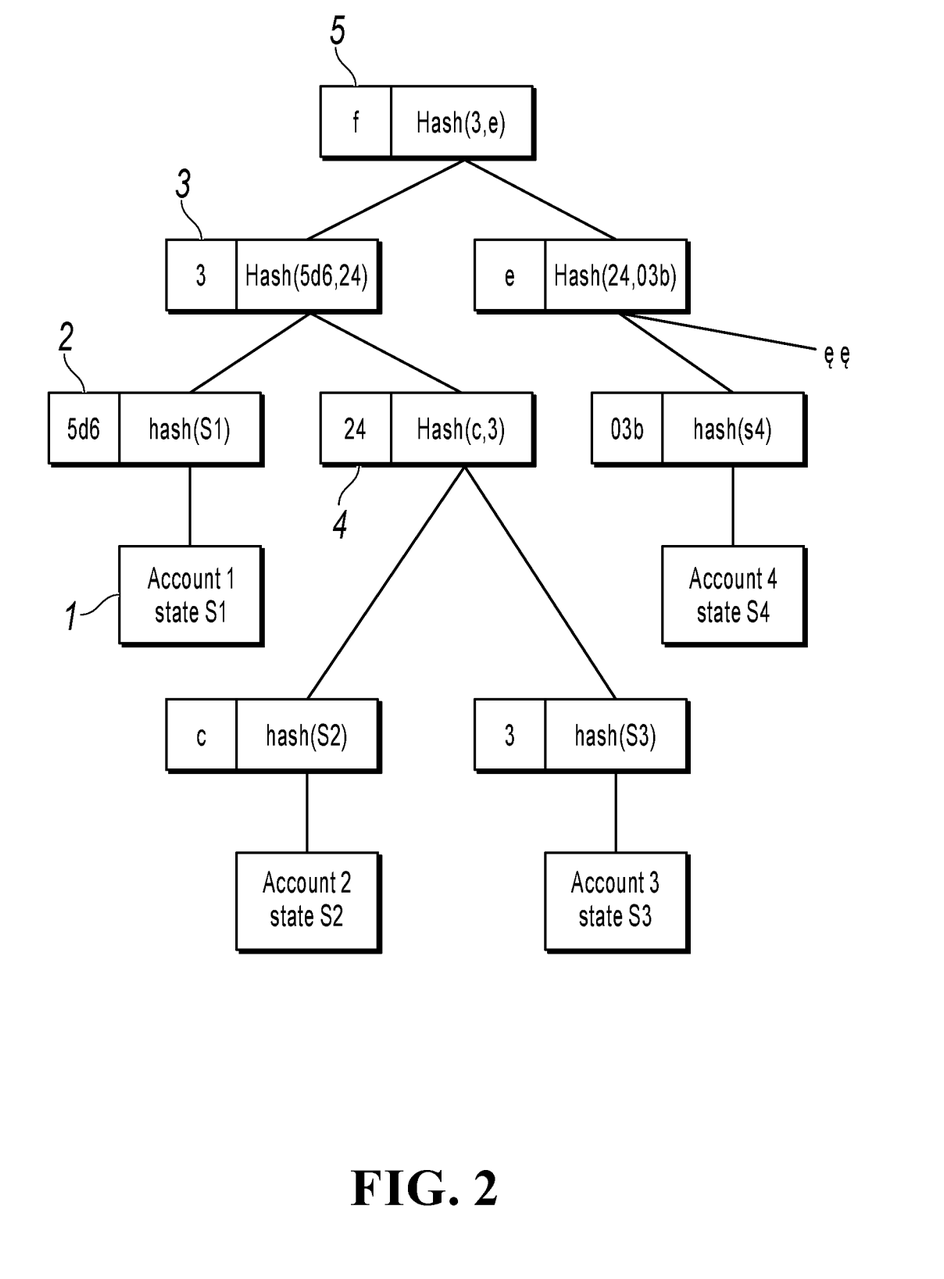
FIG. 2 shows a specific example of a state Merkle tree.

FIG. 2 shows a specific example of a state Merkle tree. In the example of FIG. 2, the state Merkle tree is an MPT tree and includes four leaf nodes and a series of branch nodes from the leaf nodes to the root node. The four leaf nodes correspond to four accounts, and values of the leaf nodes are state data of the accounts. State data of an external account can include a current balance and an initiated transaction number (nonce). State data of a contract account further includes a hash of a contract code and a state of a variable in the contract. The state of the contract variable can further be recorded by using a state Merkle tree. In other blockchains, the account state content can be modified or added based on the above example. Implementations are not limited in the present specification.

Each branch node between the leaf node and the root node records a part of characters of the account addresses and one hash value, where the hash value is determined based on child nodes of the branch node. For example, leaf node 1 records state data of account 1, and a hash value of the state data is recorded in a parent node of leaf node 1, namely, node 2. That is, a hash value of node 2 is determined based on a value of its child node, namely, node 1. A hash value of node 3 is determined based on hash values of its two child nodes: node 2 and node 4. Further, recursion continues up to the root node.

In addition, starting from the root node, address characters recorded in branch nodes traversed based on the parent-child relationship of a node jointly constitute an account address of a corresponding account, and a traversed path constitutes an addressing path to the corresponding account. For example, along a path of node 5→node 3→node 2, address characters recorded in the branch nodes jointly constitute an account address of account 1. As such, account states of multiple accounts that correspond to multiple account addresses can be recorded in the state Merkle tree shown in FIG. 2.

In another example, the MPT tree in FIG. 2 can be further improved and extended. For example, in some blockchain platforms, on the basis of a node relationship and a tree structure of the MPT tree, an extension node and a fork node are further introduced into the state Merkle tree, so account addresses and account states of a large number of accounts are more effectively recorded.

It should be understood that FIG. 2 is merely an example to describe a specific form of the state Merkle tree. There also can be another specific form of the state Merkle tree. Implementations are not limited in the present specification.

As can be seen from the example of FIG. 2, the bottom-layer leaf nodes of the state Merkle tree are used to record state data of accounts. As is known to those skilled in the art, the state of the account changes with the execution of transactions in the blockchain network. However, based on the previous structure setting of the state Merkle tree, once a value of a leaf node changes, a parent node of the leaf node needs to update its hash value. Further, a series of upward parent nodes need to update their hash values. Transactions in the blockchain network are frequently transmitted and executed, so the state Merkle tree needs to be updated frequently.

Generally, each time the state Merkle tree is updated, each parent node is sequentially and recursively updated from the bottom-layer leaf nodes until the root hash is updated. However, the state Merkle tree is very large because it records the account states of all accounts. Computing efficiency in the previous conventional method is still unsatisfactory.

Therefore, a new method for updating a state Merkle tree is proposed in an implementation of the present specification, where the state Merkle tree is split into multiple to-be-updated subtrees that are independent of each other, so the subtrees can be updated in parallel, and finally update results are combined, thereby greatly improving update efficiency of the state Merkle tree.

Figure 3:
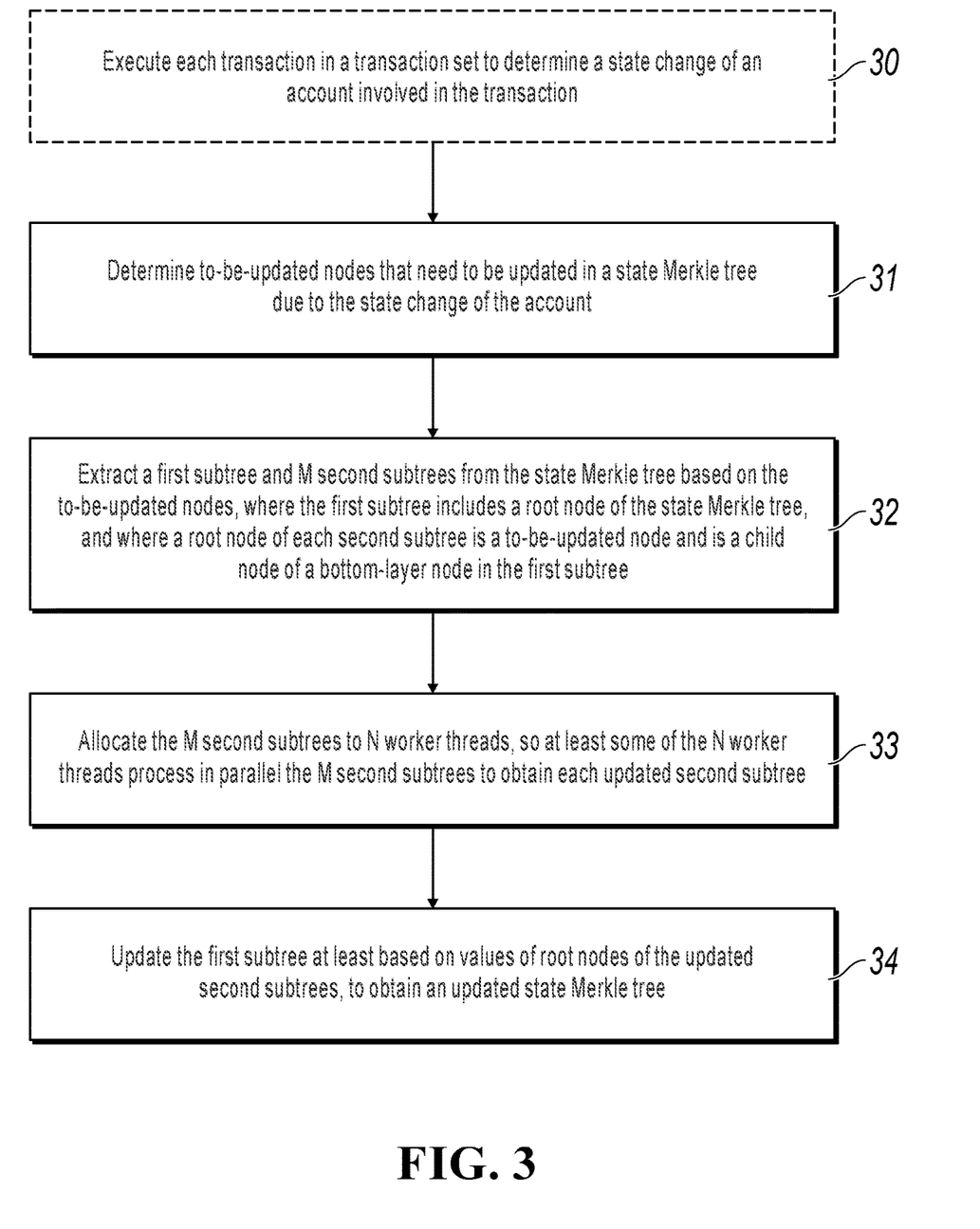
FIG. 3 is a flowchart illustrating a method for updating a state Merkle tree, according to an implementation.

FIG. 3 is a flowchart illustrating a method for updating a state Merkle tree, according to an implementation. The method can be applied to a public blockchain, a private blockchain, and a consortium blockchain. Implementations are not limited here. The method is performed by any node in a blockchain network, where the node can be implemented by any apparatus, device, platform, or device cluster that has the computing and processing capabilities. Moreover, the method can be performed by a virtual machine in a node.

As shown in FIG. 3, the method for updating a state Merkle tree can include: Step 31: Determine to-be-updated nodes that need to be updated in the state Merkle tree due to a state change of an account. Step 32: Extract one first subtree and M second subtrees from the state Merkle tree based on the to-be-updated nodes, where the first subtree includes a root node of the state Merkle tree, and a root node of each second subtree is a to-be-updated node and is a child node of a bottom-layer node in the first subtree. Step 33: Allocate the M second subtrees to N worker threads, so at least some of the N worker threads process in parallel the M second subtrees to obtain each updated second subtree. Step 34: Update the first subtree at least based on values of root nodes of the updated second subtrees, to obtain an updated state Merkle tree. The following describes in detail execution processes of the previous steps with reference to the Ethereum blockchain platform. However, the previous method is also applicable to another blockchain platform that has a similar function.

In an optional implementation, before step 31, step 30 is first performed to execute each transaction in a transaction set to determine a state change of an account involved in the transaction. Step 30 can be performed, for example, when a block is packaged, or when a newly generated block is verified.

Specifically, in an example, step 30 is performed when a new block is generated through packaging. It can be understood that any node in a blockchain network can perform block packaging to generate a new block to try to add the new block generated by the node to the blockchain. A node that performs block packaging to generate a new block can also be referred to as an accounting node. When performing packaging to generate a new block, the accounting node selects several transactions from a local transaction pool to form a transaction set, where the transaction set is included in a to-be-generated block. In this case, the accounting node that perform packaging needs to execute each transaction in the previous transaction set to determine a change of an account state caused by the transaction.

In another example, step 30 is performed when a newly generated block is verified. It can be understood that when generating a new block, the accounting node broadcasts the new block in the blockchain network. Other nodes will receive and verify the new block. A node that verifies the new block can also be referred to as a verification node. To verify the new block, the verification node needs to extract a transaction set consisting of transactions included in the verification node from a transaction list of the new block, and execute each transaction in the transaction set to determine a change of an account state caused by the transaction.

On the basis of determining the change of the account state, in step 31, the to-be-updated nodes that need to be updated in the state Merkle tree due to the state change of the account are determined. For intuitive and simple description, a to-be-updated node is referred to as a "dirty node"; correspondingly, a node that does not need to be updated can also be referred to as a clean node. In other words, step 31 is used to determine dirty nodes in the state Merkle tree.

As mentioned above, the leaf node in the state Merkle tree is used to record the state data of the account. Therefore, after the change of the account state is determined, an updated leaf node in the state Merkle tree can be determined. In addition, because nodes in the state Merkle tree are connected through hashing, and a hash value of a child node is stored in a parent node, if a node is a dirty node and its hash value needs to be updated, a parent node of the node is also a dirty node. Therefore, the process of determining dirty nodes in step 31 can include: in the state Merkle tree, tracing back to the root node starting from leaf nodes that correspond to accounts whose state changes, and determining each node on a trace path as to-be-updated dirty nodes.

Figure 4:
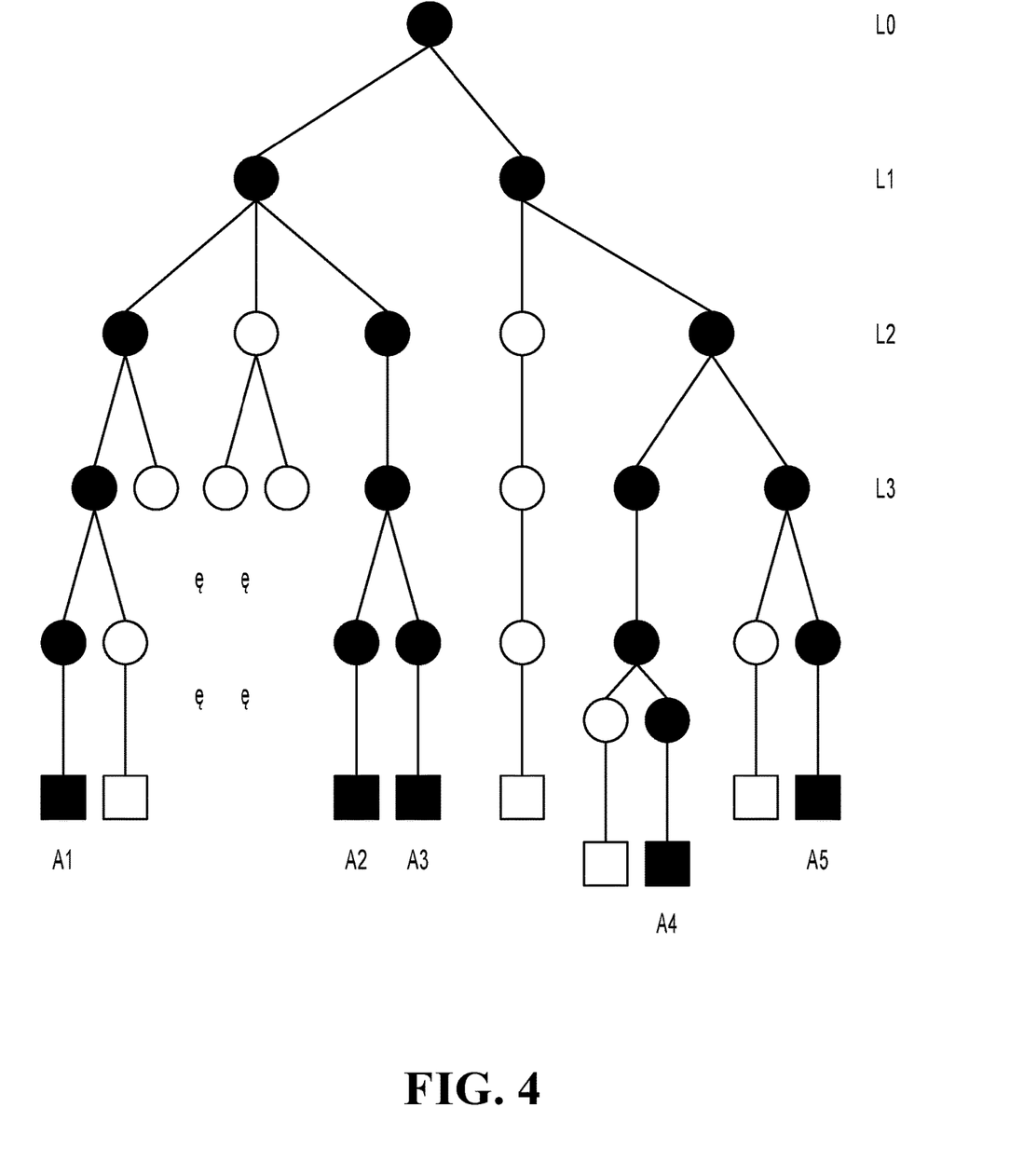
FIG. 4 is a schematic diagram of determining a dirty node in an implementation.

FIG. 4 is a schematic diagram of determining a dirty node in an implementation. In the example of FIG. 4, assume that states of accounts A1, A2, A3, A4, and A5 are changed, leaf nodes that correspond to them are updated, and the leaf nodes are indicated by gray blocks. Starting from these leaf nodes to the root node, all traversed nodes can be determined as dirty nodes that are also indicated in gray.

On the basis of determining the to-be-updated dirty nodes, in step 32, one first subtree and M second subtrees are extracted from the state Merkle tree based on these to-be-updated nodes, so the first subtree includes the root node of the state Merkle tree, and the root node of the second subtree is a to-be-updated node and is a child node of a bottom-layer node in the first subtree. For intuitive and simple description, the first subtree is referred to as a root subtree (because it contains the root node of the entire state Merkle tree), and the second subtree is referred to as a dirty subtree.

Multiple strategies can be used to extract the root subtree and multiple dirty subtrees from the state Merkle tree.

Based on an implementation strategy, the root subtree (the first subtree) is first selected according to a specific criterion, and then a dirty subtree (the second subtree) is extracted based on the root subtree.

Specifically, in an implementation, the layer number LN of the root subtree is predetermined as a criterion for selecting the root subtree. Therefore, in the state Merkle tree, nodes starting from the root node to the predetermined layer number LN are used as the root subtree. As such, it is ensured that the layer number or the depth of the root subtree meets a predetermined requirement.

In another implementation, the number N1 of dirty nodes in bottom-layer nodes of the root subtree is predetermined as the criterion for selecting the root subtree. Based on such a strategy, in the state Merkle tree, traversing is performed starting from the root node layer by layer based on a breadth-first search, if the number of dirty nodes at a current layer is less than the predetermined number N1, traversing continues to the next layer; and if the number of dirty nodes at the current layer is greater than or equal to the predetermined number N1, traversing stops and nodes starting from the root node to the current layer are extracted as the root subtree. As such, the number of dirty nodes per layer in the root subtree is ensured to meet the predetermined requirement.

In other implementations, other criteria can also be set to select the root subtree, for example, the total number of dirty nodes meets certain requirements.

After the root subtree is selected according to any of the previous criteria, the dirty subtree is extracted based on the root subtree. Specifically, the dirty nodes in the bottom-layer nodes of the root subtree can be obtained as a first node set. Then, dirty nodes in child nodes of the nodes in the first node set are obtained as a second node set. Further, each node in the second node set is used as a starting node to obtain subtrees starting from each starting node to a leaf node as dirty subtrees. As such, it can be ensured that there is no intersection between the dirty subtrees, and a root node of the dirty subtree is a child node of the bottom-layer node in the root subtree.

Figure 5:
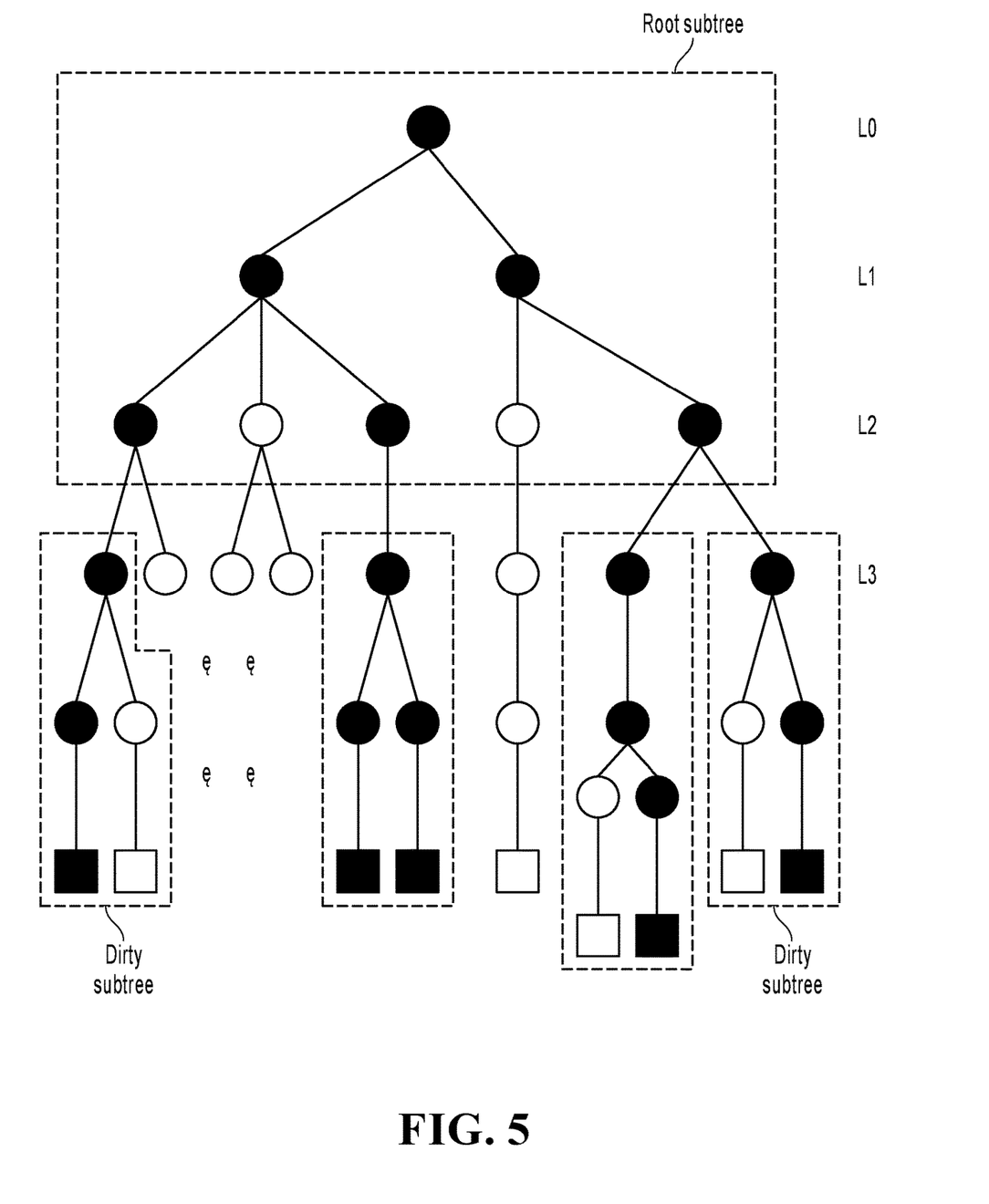
FIG. 5 is a schematic diagram illustrating a first subtree and a second subtree that are extracted, according to an implementation.

The example of FIG. 4 is still used to describe the process of determining the root subtree and the dirty subtree based on the dirty nodes in the state Merkle tree of FIG. 4. Assume that the predetermined number threshold of dirty nodes in the bottom-layer nodes of the root subtree is N1=3. Then, traversing is performed layer by layer starting from the root node in FIG. 4. The number of dirty nodes at the second layer L1 is 2 and is lower than the previous threshold N1, and traversing continues to the next layer. The number of dirty nodes at the third layer L2 is 3 and reaches the previous threshold N1. Therefore, nodes starting from the root node to layer L2 can be used as the root subtree (the first subtree), as shown in FIG. 5.

The following is described with reference to FIG. 5. After the root subtree is determined, the dirty subtree starts to be extracted. It can be seen that there are three dirty nodes (the three dirty nodes constitute the previous first node set) in the bottom-layer nodes of the root subtree, the three dirty nodes have six child nodes in total, and there are four dirty nodes (the four dirty nodes constitute the previous second node set) in the six child nodes. As such, each of the four dirty nodes is used as a starting node (that is, the root node of the dirty subtree) to obtain subtrees starting from each starting node to a leaf node as dirty subtrees, thereby obtaining four dirty subtrees.

In the previous method, the root subtree is first determined, and the dirty subtrees are obtained based on the dirty nodes in the child nodes of the bottom-layer nodes in the root subtree, so the entire state Merkle tree is divided into a root subtree, a dirty subtree, and another clean subtree.

It can be seen that the root subtree is associated with the dirty subtrees through its bottom-layer nodes. According to another implementation strategy, a dirty subtree can be first selected based on a specific selection criterion, to obtain a root subtree. Or division is performed on nodes at a certain layer based on a specific division criterion, to separately obtain a root subtree and a dirty subtree.

Specifically, in an implementation, another dirty-node number threshold N2 is predetermined. In the state Merkle tree, traversing is performed layer by layer starting from the root node based on a breadth-first search, if the number of dirty nodes at a current layer is less than the previous threshold N2, traversing continues, and if the number of dirty nodes at the current layer is greater than or equal to the threshold N2, each of the dirty nodes at the current layer is used as a starting node to obtain subtrees starting from each starting node to a leaf node as dirty subtrees. In addition, nodes starting from the root node to the upper layer of the current layer are extracted as the root subtree. Based on such a strategy, it can be ensured that the obtained number of dirty subtrees is greater than or equal to N2.

The state Merkle tree in FIG. 4 is still used for description. In an example, assume that a predetermined number threshold of dirty nodes is N2=4. Traversing is performed layer by layer starting from the root node in FIG. 4. The number of dirty nodes at each of the first layer L0, the second layer L1, and the third layer L2 does not reach the threshold N2, and traversing continues to the next layer. At the fourth layer L3, the number of dirty nodes is 4 and reaches the previous threshold N2. Therefore, each of four dirty nodes at this layer is used as a starting node (that is, the root node of the dirty subtree) to obtain subtrees starting from each starting node to a leaf node as dirty subtrees, thereby obtaining four dirty subtrees. In addition, nodes starting from the upper layer of this layer, that is, the layer L2, to the root node of the entire Merkle tree are used as the root subtree. As such, the root subtree and the dirty subtrees shown in FIG. 5 are also obtained.

Although the same subtrees are obtained, strategies are not the same. In fact, for one state Merkle tree, it is possible to obtain different distributions of root subtrees and dirty subtrees by using different strategies. For example, if N2 is also set to 3, the root subtree includes only nodes at layers L0 to L1, and dirty nodes at layer L2 are used as root nodes of the dirty subtrees to obtain three dirty subtrees.

Regardless of a strategy, the finally obtained root subtree is a subtree starting from the root node of the state Merkle tree to a certain depth, and the root node of the dirty subtree is a child node of a bottom-layer node in the root subtree and is a dirty node. As such, it can be ensured that root nodes of all dirty subtrees are located at the same layer, and all the dirty subtrees are mutually exclusive and do not intersect. Therefore, update computing can be separately performed.

Therefore, for the root subtree and the dirty subtrees determined above, in step 33, all the dirty subtrees are allocated to multiple worker threads, so each worker thread processes in parallel the dirty subtree to update the dirty subtrees.

It should be understood that the worker thread here can be a thread different from the thread that performs steps 31 and 32. In an implementation, steps 31 and 32 are performed by using a main thread, and after multiple dirty subtrees are determined, the multiple dirty subtrees are allocated to multiple worker threads for parallel update.

Generally, the state Merkle tree has a relatively balanced tree structure, that is, the number of layers between each leaf node and the root node is similar. Root nodes of dirty subtrees are located at the same layer, and therefore each dirty subtree has the basically equivalent depth. Therefore, the computation amount of updating each dirty subtree is also equivalent, which further facilitates parallel update of the dirty subtrees.

For clarity and convenience of description, assume that the number of dirty subtrees obtained in step 32 is M, and the number of available worker threads is N.

In an example, the number M of dirty subtrees is less than or equal to the number N of available worker threads. In this case, the dirty subtrees can be sequentially allocated to different worker threads. Therefore, the M dirty subtrees are updated in parallel in different worker threads. The update process can be: starting from a leaf node of the dirty subtree, re-computing a hash of a dirty node layer by layer upwards until the root node of the dirty tree, to update the dirty tree.

In an example, the number M of dirty subtrees is greater than the number N of available worker threads. In this case, a modulo method can be used to allocate the dirty subtrees. The M dirty subtrees can be separately numbered, for example, numbered T(0) to T(M−1). In addition, the N worker threads are also numbered, for example, numbered W(0) to W(N−1). For any subtree i in the M dirty subtrees, the result i mod N of a number that corresponds to the subtree i modulo N, and the result i mod N is allocated to a worker thread WT(i mod N) whose number is the modulo result.

For example, assume that there are five worker threads and nine dirty subtrees. Dirty subtrees numbered 1 and 6 are allocated to worker thread 1, dirty subtrees numbered 2 and 7 are allocated to worker thread 2, etc. In this case, it is possible that one worker thread is allocated multiple dirty subtrees. Then, the worker thread sequentially updates the allocated dirty subtrees. Because the M dirty subtrees are distributed in the N worker threads, some of the M dirty subtrees can be process in paralleled.

In an implementation, a modulo method is used to allocate dirty subtrees regardless of whether M or N is larger.

In practice, the predetermined threshold in the subtree selection criterion can be adjusted, so the number M of obtained dirty subtrees is equivalent to the number of available worker threads N, thereby improving update concurrency of dirty subtrees.

After each worker thread updated each dirty subtree, updated root hashes of the dirty subtrees can be provided to the main thread. Therefore, in step 34, the main thread updates the root subtree at least based on the updated hash values of the root nodes, to obtain the updated entire state Merkle tree.

It can be understood that, because the root node of the dirty subtree is a child node of the bottom-layer node in the root subtree, the bottom-layer node in the root subtree can be updated based on the updated root hash values of the dirty subtrees and hash values of corresponding clean nodes. Further, the hash values are recursively updated layer by layer up to the root node. In this case, the root subtree is also updated. The updated root subtree, the updated dirty subtree, and the clean subtree that do not need to be updated together constitute the entire updated state Merkle tree.

As mentioned above, the state Merkle tree can be updated when a new block is generated through packaging or when a new block is verified. When a new block is generated, after the updated state Merkle tree is obtained, the previously selected transaction set is packaged into the block, and a root hash of the updated state Merkle tree is recorded into the block, that is, recorded into the state root in FIG. 1. When a new block is verified, after the updated state Merkle tree is obtained, a hash value of a root node of the updated state Merkle tree is compared with a value of a state root of the to-be-verified block. If the two values are consistent, verification succeeds.

In practice, for each update of the state Merkle tree, only relevant data of an updated node can be recorded, and the data of the updated node is combined with unchanged node data in a link or pointer method.

It can be seen from the previous process that, when a state Merkle tree needs to be updated, the part that needs to be updated in the state Merkle tree is divided into a root subtree on an upper layer and multiple mutually independent dirty subtrees below the root subtree according to some implementation of the present specification. Then, the multiple dirty subtrees are updated in parallel by using multiple worker threads. Finally, the root subtree is updated based on the results of updating the dirty subtrees by the worker threads, to update the entire state Merkle tree. Compared with a conventional method that update processing is performed upward layer by layer in series starting from a leaf node, the method for processing multiple dirty subtrees in parallel and then performing summarization can significantly improve update efficiency of the state Merkle tree, thereby improving system performance of an entire blockchain network.

Figure 6:
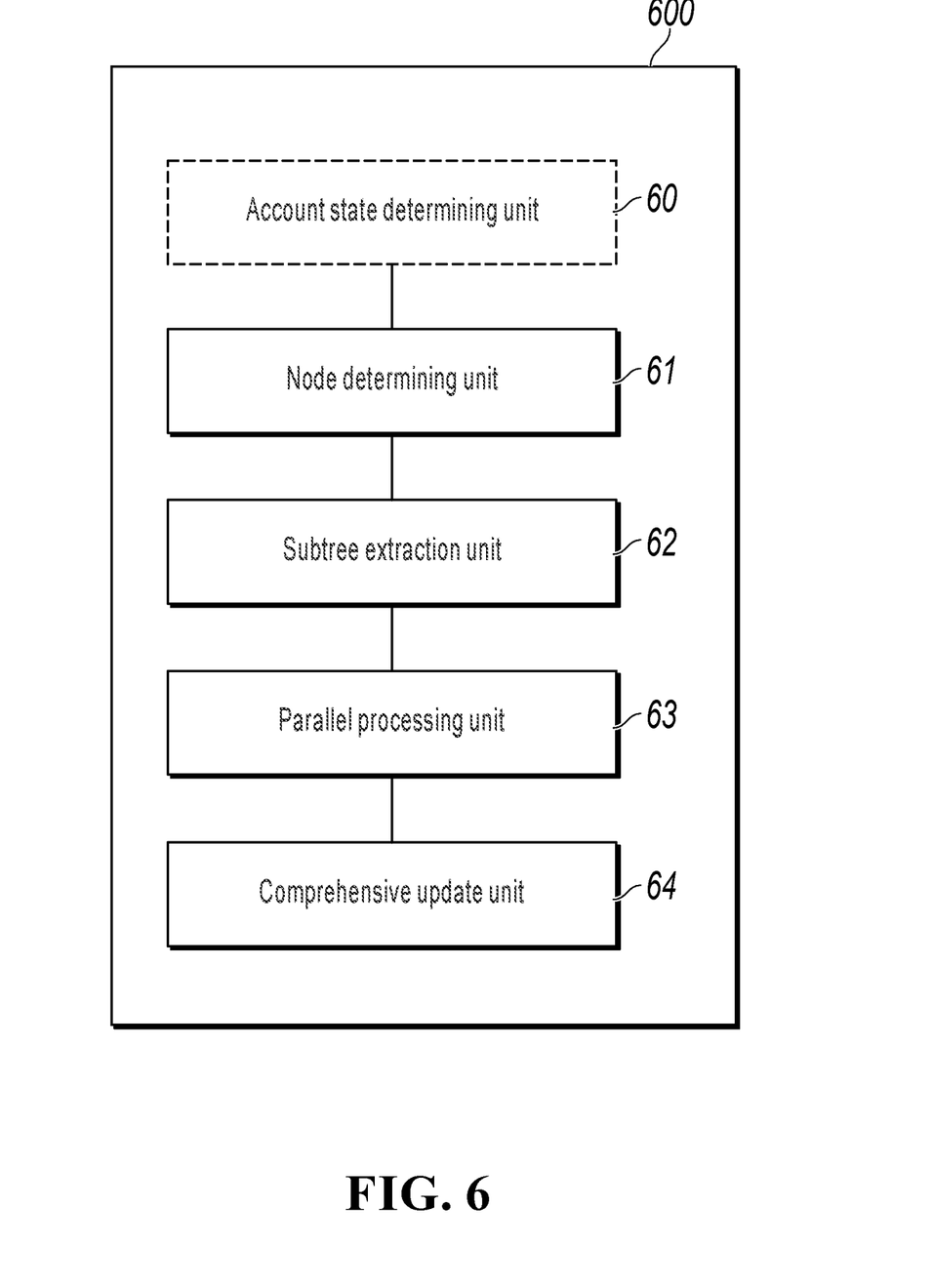
FIG. 6 is a schematic block diagram illustrating an apparatus for updating a state Merkle tree, according to an implementation.

According to an implementation of another aspect, an apparatus for updating a state Merkle tree is provided. The state Merkle tree is used to store a state of an account in a blockchain network, and the apparatus is deployed in any node in the blockchain network. The node can be embodied as any device, platform, or device cluster that has the computing and processing capabilities. FIG. 6 is a schematic block diagram illustrating an apparatus for updating a state Merkle tree, according to an implementation. As shown in FIG. 6, the update apparatus 600 includes: a node determining unit 61, configured to determine to-be-updated nodes that need to be updated in the state Merkle tree due to a state change of the account; a subtree extraction unit 62, configured to extract one first subtree and M second subtrees from the state Merkle tree based on the to-be-updated nodes, where the first subtree includes a root node of the state Merkle tree, where there is no intersection between any two of the M second subtrees, where a root node of each second subtree is a to-be-updated node and is a child node of a bottom-layer node in the first subtree, and where M is an integer greater than 1; a parallel processing unit 63, configured to allocate the M second subtrees to N worker threads, so at least some of the N worker threads process in parallel the M second subtrees to obtain each updated second subtree, where N is an integer greater than 1; and a comprehensive update unit 64, configured to update the first subtree at least based on hash values of root nodes of the updated second subtrees, to obtain an updated state Merkle tree.

In an implementation, the apparatus 600 further includes an account state determining unit 60, configured to execute each transaction in a transaction set to determine a state change of an account involved in the transaction.

Specifically, in an implementation, the previous transaction set can be a set consisting of multiple transactions selected from a local transaction pool. In such case, the apparatus 600 further includes a block generation unit (not shown), configured to package the transaction set into a to-be-generated first block after the updated state Merkle tree is obtained, and record a hash value of a root node of the updated state Merkle tree into the first block.

In another implementation, the previous transaction set is a set consisting of transactions included in a to-be-verified block. In such a case, the apparatus 600 further includes a block verification unit (not shown), configured to compare a hash value of a root node of the updated state Merkle tree with a value of a state root recorded in the to-be-verified block after the updated state Merkle tree is obtained, to verify the to-be-verified block.

According to an implementation, the node determining unit 61 is configured to: in the state Merkle tree, trace back to the root node starting from all leaf nodes that correspond to accounts whose state changes, and determine each node on a trace path as the to-be-updated nodes.

In an implementation, the subtree extraction unit 62 is configured to extract nodes starting from the root node to a predetermined layer in the state Merkle tree as the first subtree.

In another implementation, the subtree extraction unit 62 is configured to traverse the state Merkle tree layer by layer starting from the root node based on a breadth-first search, and if the number of to-be-updated nodes at a current layer is greater than or equal to a first predetermined threshold, extract nodes starting from the root node to the current layer as the first subtree.

Further, in an implementation, the subtree extraction unit 62 is further configured to: obtain to-be-updated nodes in bottom-layer nodes of the first subtree as a first node set; obtain to-be-updated nodes in child nodes of each node in the first node set as a second node set; and separately use each node in the second node set as a starting node to obtain subtrees starting from each starting node to a leaf node as the M second subtrees.

According to another implementation, the subtree extraction unit 62 is configured to: traverse the state Merkle tree layer by layer starting from the root node based on a breadth-first search, if the number of to-be-updated nodes at a current layer is greater than or equal to a second predetermined threshold, extract nodes starting from the root node to the upper layer of the current layer as the first subtree, and use each to-be-updated node at the current layer as a starting node to obtain subtrees starting from each starting node to a leaf node as the M second subtrees.

According to an implementation, the parallel processing unit 63 is configured to: separately number the M second subtrees and the N worker threads, so each second subtree has a corresponding first number, and each worker thread has a corresponding second number; and for any second subtree of the M second subtrees, determine a modulo result of a first number modulo N, and allocate the second subtree to a worker thread whose second number is the modulo result, where the first number corresponds to the second subtree.

According to an implementation of another aspect, a computer readable storage medium is further provided, on which a computer program is stored. When the computer program is executed in a computer, the computer is caused to perform the method described with reference to FIG. 3.

According to an implementation of still another aspect, a computing device is further provided and includes a memory and a processor. Executable code is stored in the memory, and when executing the executable code, the processor implements the method with reference to FIG. 3.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium.

The objectives, technical solutions, and benefits of the present disclosure are further described in detail in the earlier-described specific implementations. It should be understood that the earlier-described descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for updating a blockchain network, the method comprising:
accessing data related to a state Merkle tree, wherein the state Merkle tree stores a state of an account in the blockchain network;
determining to-be-updated nodes that need to be updated in the state Merkle tree due to a state change of the account;
extracting a first subtree and M second subtrees from the state Merkle tree based on the to-be-updated nodes, wherein the first subtree comprises a root node of the state Merkle tree, wherein there is no intersection between any two of the M second subtrees, wherein a root node of each second subtree is a to-be-updated node and is a child node of a bottom-layer node in the first subtree, and wherein M is an integer greater than 1;

allocating the M second subtrees to N worker threads, wherein two or more of the N worker threads process in parallel the M second subtrees to obtain M updated root hashes corresponding to the M second subtrees, wherein N is an integer greater than 1;

updating at least the first subtree from one or more leaf nodes of the first subtree to the root node of the state Merkle tree based on the M updated root hashes obtained from the N worker threads, to obtain an updated state Merkle tree; and verifying a first block of the blockchain network by comparing a hash value of a root node of the updated state Merkle tree with a value of a state root recorded in the first block, wherein the first block comprises a transaction set.

2. The computer-implemented method according to claim 1, further comprising, before determining the to-be-updated nodes that need to be updated in the state Merkle tree due to the state change of the account:

executing each transaction in the transaction set to determine the state change of the account involved in the transaction.

3. The computer-implemented method according to claim 2, wherein the transaction set is a set consisting of multiple transactions selected from a local transaction pool, and wherein the method further comprises:

packaging the transaction set into the first block after the updated state Merkle tree is obtained, and recording the hash value of the root node of the updated state Merkle tree into the first block.

4. The method according to claim 1, wherein determining the to-be-updated nodes that need to be updated in the state Merkle tree due to the state change of the account comprises:

in the state Merkle tree, tracing back to the root node of the state Merkle tree starting from all leaf nodes that correspond to accounts whose state changes, and determining each node on a trace path as the to-be-updated nodes.

5. The method according to claim 1, wherein extracting the first subtree and the M second subtrees from the state Merkle tree based on the to-be-updated nodes comprises:

extracting nodes starting from the root node of the state Merkle tree to a predetermined layer in the state Merkle tree as the first subtree.

6. The method according to claim 1, wherein extracting the first subtree and the M second subtrees from the state Merkle tree based on the to-be-updated nodes comprises:

traversing the state Merkle tree layer by layer starting from the root node of the state Merkle tree based on a breadth-first search, and if a number of to-be-updated nodes at a current layer is greater than or equal to a first predetermined threshold, extracting nodes starting from the root node of the state Merkle tree to the current layer as the first subtree.

7. The method according to claim 5, wherein extracting the first subtree and the M second subtrees from the state Merkle tree based on the to-be-updated nodes comprises:

obtaining one or more nodes of the to-be-updated nodes in bottom-layer nodes of the first subtree as a first node set;

obtaining one or more nodes of the to-be-updated nodes in child nodes of each node in the first node set as a second node set; and separately using each node in the second node set as a starting node to obtain subtrees starting from each starting node to a leaf node as the M second subtrees.

8. The method according to claim 1, wherein extracting the first subtree and the M second subtrees from the state Merkle tree based on the to-be-updated nodes comprises:

traversing the state Merkle tree layer by layer starting from the root node of the state Merkle tree based on a breadth-first search, if a number of to-be-updated nodes at a current layer is greater than or equal to a second predetermined threshold, extracting nodes starting from the root node of the state Merkle tree to a layer above the current layer as the first subtree, and using each to-be-updated node at the current layer as a starting node to obtain subtrees starting from each starting node to a leaf node as the M second subtrees.

9. The method according to claim 1, wherein allocating the M second subtrees to the N worker threads comprises:

separately numbering the M second subtrees and the N worker threads, so each second subtree has a corresponding first number, and each worker thread has a corresponding second number; and for a second subtree of the M second subtrees, determining a modulo result of the corresponding first number modulo the corresponding second number, and allocating the second subtree to a worker thread whose second number is the modulo result, wherein the corresponding first number corresponds to the second subtree.

10. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for updating a blockchain network, wherein the operations comprise:

accessing data related to a state Merkle tree, wherein the state Merkle tree stores a state of an account in the blockchain network;

determining to-be-updated nodes that need to be updated in the state Merkle tree due to a state change of the account;

extracting a first subtree and M second subtrees from the state Merkle tree based on the to-be-updated nodes, wherein the first subtree comprises a root node of the state Merkle tree, wherein there is no intersection between any two of the M second subtrees, wherein a root node of each second subtree is a to-be-updated node and is a child node of a bottom-layer node in the first subtree, and wherein M is an integer greater than 1;

allocating the M second subtrees to N worker threads, wherein two or more of the N worker threads process in parallel the M second subtrees to obtain M updated root hashes corresponding to the M second subtrees, wherein N is an integer greater than 1;

updating at least the first subtree from one or more leaf nodes of the first subtree to the root node of the state Merkle tree based on the M updated root hashes obtained from the N worker threads, to obtain an updated state Merkle tree; and verifying a first block of the blockchain network by comparing a hash value of a root node of the updated state Merkle tree with a value of a state root recorded in the first block, wherein the first block comprises a transaction set.

11. The computer-implemented system of claim 10, wherein extracting the first subtree and the M second subtrees from the state Merkle tree based on the to-be-updated nodes comprises:
traversing the state Merkle tree layer by layer starting from the root node of the state Merkle tree based on a breadth-first search, and if a number of to-be-updated nodes at a current layer is greater than or equal to a first predetermined threshold, extracting nodes starting from the root node of the state Merkle tree to the current layer as the first subtree.

12. The computer-implemented system of claim 10, wherein allocating the M second subtrees to the N worker threads comprises:
separately numbering the M second subtrees and the N worker threads, so each second subtree has a corresponding first number, and each worker thread has a corresponding second number; and
for a second subtree of the M second subtrees, determining a modulo result of the corresponding first number modulo the corresponding second number, and allocating the second subtree to a worker thread whose second number is the modulo result, wherein the corresponding first number corresponds to the second subtree.

13. A non-transitory, computer-readable medium storing one or more instructions executable by a computer system to perform operations for updating a blockchain network, wherein the operations comprise:
accessing data related to a state Merkle tree, wherein the state Merkle tree stores a state of an account in the blockchain network;
determining to-be-updated nodes that need to be updated in the state Merkle tree due to a state change of the account;
extracting a first subtree and M second subtrees from the state Merkle tree based on the to-be-updated nodes, wherein the first subtree comprises a root node of the state Merkle tree, wherein there is no intersection between any two of the M second subtrees, wherein a root node of each second subtree is a to-be-updated node and is a child node of a bottom-layer node in the first subtree, and wherein M is an integer greater than 1;
allocating the M second subtrees to N worker threads, wherein two or more of the N worker threads process in parallel the M second subtrees to obtain M updated root hashes corresponding to the M second subtrees, wherein N is an integer greater than 1;
updating at least the first subtree from one or more leaf nodes of the first subtree to the root node of the state Merkle tree based on the M updated root hashes obtained from the N worker threads, to obtain an updated state Merkle tree; and
verifying a first block of the blockchain network by comparing a hash value of a root node of the updated state Merkle tree with a value of a state root recorded in the first block, wherein the first block comprises a transaction set.

14. The non-transitory, computer-readable medium of claim 13, further comprising, before determining the to-be-updated nodes that need to be updated in the state Merkle tree due to the state change of the account:
executing each transaction in the transaction set to determine the state change of the account involved in the transaction.

15. The non-transitory, computer-readable medium of claim 14, wherein the transaction set is a set consisting of multiple transactions selected from a local transaction pool, and wherein the operations further comprise:
packaging the transaction set into the first block after the updated state Merkle tree is obtained, and recording the hash value of the root node of the updated state Merkle tree into the first block.

16. The non-transitory, computer-readable medium of claim 13, wherein determining the to-be-updated nodes that need to be updated in the state Merkle tree due to the state change of the account comprises:
in the state Merkle tree, tracing back to the root node of the state Merkle tree starting from all leaf nodes that correspond to accounts whose state changes, and determining each node on a trace path as the to-be-updated nodes.

17. The non-transitory, computer-readable medium of claim 13, wherein extracting the first subtree and the M second subtrees from the state Merkle tree based on the to-be-updated nodes comprises:
traversing the state Merkle tree layer by layer starting from the root node of the state Merkle tree based on a breadth-first search, and if a number of to-be-updated nodes at a current layer is greater than or equal to a first predetermined threshold, extracting nodes starting from the root node of the state Merkle tree to the current layer as the first subtree.

18. The non-transitory, computer-readable medium of claim 13, wherein extracting the first subtree and the M second subtrees from the state Merkle tree based on the to-be-updated nodes comprises:
traversing the state Merkle tree layer by layer starting from the root node of the state Merkle tree based on a breadth-first search, if a number of to-be-updated nodes at a current layer is greater than or equal to a second predetermined threshold, extracting nodes starting from the root node of the state Merkle tree to a layer above the current layer as the first subtree, and using each to-be-updated node at the current layer as a starting node to obtain subtrees starting from each starting node to a leaf node as the M second subtrees.

* * * * *